United States Patent [19]

LaBarre et al.

[11] 4,384,298
[45] May 17, 1983

[54] PLOTTER

[75] Inventors: Lawrence J. LaBarre, Mountain View; Bernard M. Oliver, Los Altos Hills; Charles E. Tyler, Sunnyvale; Dennis C. Thompson, Campbell; Armand P. Neukermans; Douglass McManigill, both of Palo Alto, all of Calif.

[73] Assignee: Hewlett Packard Company, Palo Alto, Calif.

[21] Appl. No.: 358,551

[22] Filed: Mar. 16, 1982

Related U.S. Application Data

[63] Continuation of Ser. No. 200,127, Oct. 24, 1980, abandoned.

[51] Int. Cl.³ .................... G01D 15/16; G01D 15/24
[52] U.S. Cl. ...................................... 346/129; 346/134
[58] Field of Search ...................... 346/129, 134, 136

[56] References Cited

U.S. PATENT DOCUMENTS 3,650,448 3/1972 Jarmy ............................ 346/136 UX
3,761,950 9/1973 Yeiser ............................ 346/129 X
4,216,482 8/1980 Mason ............................ 346/129

FOREIGN PATENT DOCUMENTS

471015 8/1937 United Kingdom .............. 346/134

Primary Examiner—George H. Miller, Jr.
Attorney, Agent, or Firm—Allston L. Jones; Jon R. Stark

[57] ABSTRACT

An X-Y recorder for high speed plotting on a plain web, i.e., a web without registration holes or other special means to maintain alignment of the web during plotting. Two embodiments of these plotters are disclosed with one degree of motion being achieved by moving the web and the second degree of motion being obtained by moving a pen assembly substantially perpendicularly to the movement of the web. To enhance the repeatability of the plotting on the web as it is moved back and forth, a random rough surfaced drive wheel assembly is included with that wheel surface making indentations along one surface of the driven edge of the web as it is first passed through the drive wheel assembly. Then as the web is reversed, these indentations substantially remesh with the random rough surface of the drive wheels.

21 Claims, 15 Drawing Figures

PLOTTER

CROSS REFERENCE TO RELATED APPLICATION

This is a continuation of application Ser. No. 200,127, filed Oct. 24, 1980 now abandoned.

BACKGROUND OF THE INVENTION

In general, there are two types of XY recorders in common usage. There is the stationary paper type and there is the moving paper type. In the stationary paper type, the size of the plotting surface is limited by the size of the web which the recorder can hold. In the moving paper type, the size of the plot is limited only as to the width of the web, i.e., the web may be of any desired length since one degree of freedom is being achieved by the movement of the web.

In the moving web type XY recorder, the web is moved typically by means of registration holes along each edge of the web that are parallel to the direction of travel of the web with toothed driving wheels meshing with those registration holes to impart movement to the web. The moving paper type XY recorders that do not use the registration holes along the edge typically have a defined channel that extends the full length of the plotting surface and is substantially the same width as the web. This confines the web so there is no side to side motion as the web is advanced through that channel.

To increase plotting speed, it is desirable to be able to plot in both directions, both forward and backward. Unless some provisions have been made to prevent slippage of the paper either from side to side or from end to end, the accuracy of the plot will be greatly reduced since the element of repeatability will be missing. A web having the registration holes along its edge minimizes slippage at the cost of a more complex driving system and more expensive web material. The other type of moving web recorder typically relies on the narrow, long defined channel through which the web is advanced and retracted during plotting. However, this does not cure the problem of slippage from end to end. This second type of recorder also presents a considerable amount of friction between the two edges of the web and the long channel through which it passes, thus adding drag to the web and limiting the speed at which the web may be advanced and retracted during plotting. Also, in this configuration, web width tolerances can make the web too tight or too loose in the channel resulting in side to side movement or buckling of the web, further increasing plotting inaccuracies.

In both of these types of recorders, both edges of the paper are typically driven requiring a recorder that is at least as wide as the web. Additionally, many of these recorders use a heavy and necessarily slow pen head means that rides on a bar that spans the width of the web.

It would be desirable to have an XY recorder that is smaller in size, does not require registration holes along the edge of the web to achieve repeatability, and is capable of high speed operation.

SUMMARY OF THE INVENTION

The present invention provides a high speed XY plotting system for forming visual images on a plain web, i.e., one without registration holes along its edges. This system includes a driving means coupled to at least one edge of the web for imparting motion to the web to provide a first direction of motion in response to a first applied signal, a second means for forming selected visual images on the web that is movable substantially perpendicularly to the direction of travel of the web to provide a second direction of motion in response to a second applied signal and a third means for imparting motion to the second means in response to a third applied signal. In this system, the first means includes a drive means with at least one powered drive wheel in contact with the web having a rough driving surface with a random pattern of raised spots and an idler wheel opposite to the drive wheel to form a pinch roller assembly with the web between the drive and idler wheels. With this configuration, the rough driving surface of the drive wheel makes a series of indentations along the driven edge of the web the first time the web passes through the pinch roller. These indentations then mate directly with the rough surface of the drive wheel as the web is passed back and forth through the pinch roller multiple times through this "gearing" of the web and the drive wheel, thus slippage of the web during the plotting process is minimized.

The second means referred to above further includes a plotting pen head assembly having therein a pen means that is rotationally mounted substantially at its center of gravity to minimize the energy necessary to raise and lower the writing tip of the pen. This pen head assembly is made of a lightweight construction to maximize the speed at which it can traverse the web and the pen means is also of lightweight, low mass construction to provide a short response time for the raising and lowering of the pen tip from and to the surface of the web.

To couple the driving power between the drive wheels, these wheels are coupled via a toothed belt which passes over a pulley-like wheel attached to the shaft of the drive wheel. The surface of this pulley-like wheel is machined to substantially mate with the teeth of the belt to minimize slippage between the drive wheels.

In one embodiment of the present invention, the web is driven by a single edge. To add stability to the web for reducing the yaw and in/out motion of the web as it is driven, a ramp on the forward edge of the plotter is included with the driven edge of the web being bent upward from the plotting surface of the web.

DESCRIPTION OF THE PREFERRED EMBODIMENT

Disclosed herein are two high speed X-Y plotter embodiments wherein one degree of motion is achieved by moving the paper and the second degree of motion is achieved by moving the pen assembly perpendicularly to the motion of the paper. For full versatility, the paper and the pen assembly can be moved independently of each other or simultaneously with the pen being raised and lowered in conjunction with the movements of the pen and the paper to cause the required lines or characters to be printed on the paper.

This specification includes descriptions of two embodiments of the above-described plotter. The first embodiment is a pocket plotter configuration which is shown in FIGS. 1 through 6. The second embodiment is a table configuration which is shown in FIGS. 7 through 10.

Figures 1A, 1B:
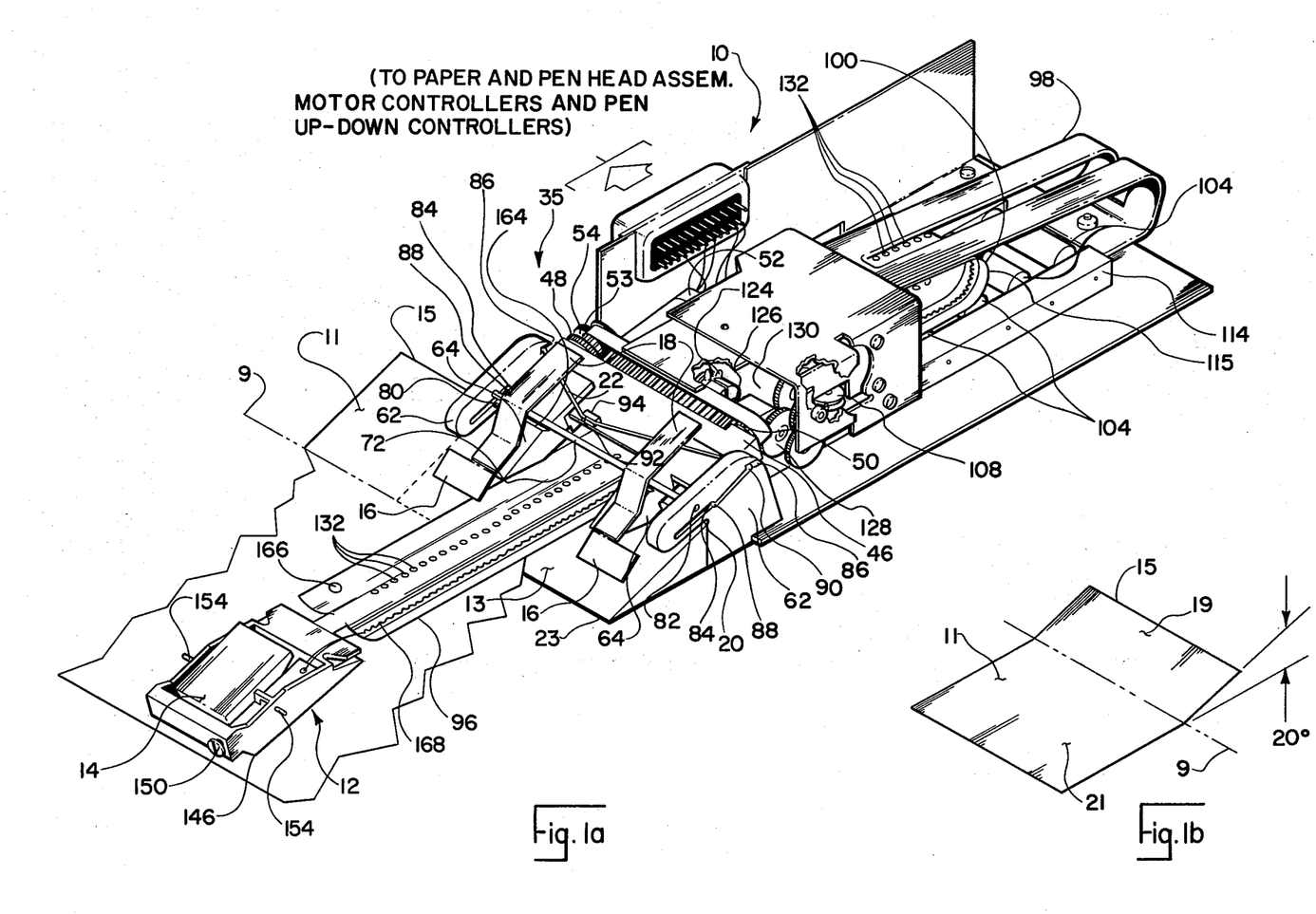
FIG. 1a shows a projection of an assembled pocket plotter.
FIG. 1b shows how the paper on which the plotter of FIG. 1a plots is bent during plotting.

With reference to FIG. 1a, there is shown a pocket plotter 10 dimensioned to contain the means and apparatus for moving paper 11 on which the plot is to be made, for moving pen head assembly 12, and for raising and lowering pen unit 14 within pen head assembly 12.

Paper 11 is inserted into plotter 10 between jaws 16 and the surface of ramp 13 after opening jaws 16 by depressing levers 18 with pen head assembly 12 fully retracted into plotter 10. Edge 15 of paper 11 is then slipped between jaws 16 and ramp 13 until paper edge 15 contacts paper stops 17 (see FIG. 2) which are aligned forward of the deepest portion of notches 20 at the top of ramp 13. When paper 11 is in position, levers 18 are released and spring 22 closes jaws 16 onto paper 11, as well as pinching paper edge 15 between rubber idlers 26 and 28, and paper drive rollers 30 and 32, respectively (see FIG. 2).

FIG. 1b shows that paper 11, when in position for plotting, is divided sharply into two planes; a plotting portion 21 in one plane and an edge-driven portion 19 in a second plane along plane division line 9. Plotting portion 21 consists of that portion of paper 11 which is forward of edge 23 of ramp 13 or line 9 and effectively lies flat on the plotting surface. Edge driven portion 19 consists of that portion of paper 11 which comes into contact with ramp 13 as paper 11 is driven by paper drive rollers 30 and 32 (see FIG. 2) and is bent up from the plotting surface by about 20 at line 9. This bending up of the edge-driven portion 19, that is maintained at line 9 by the closure of jaws 16 well forward of driven edge 15, gives paper 11 a three-dimensional shape which greatly reduces the yaw and in/out motion of paper 11 as it is driven from side to side (i.e., planar rigidity of paper 11 is maintained in both portions 19 and 21, as well as transmittal rigidity between the two portions 19 and 21).

Figure 2:
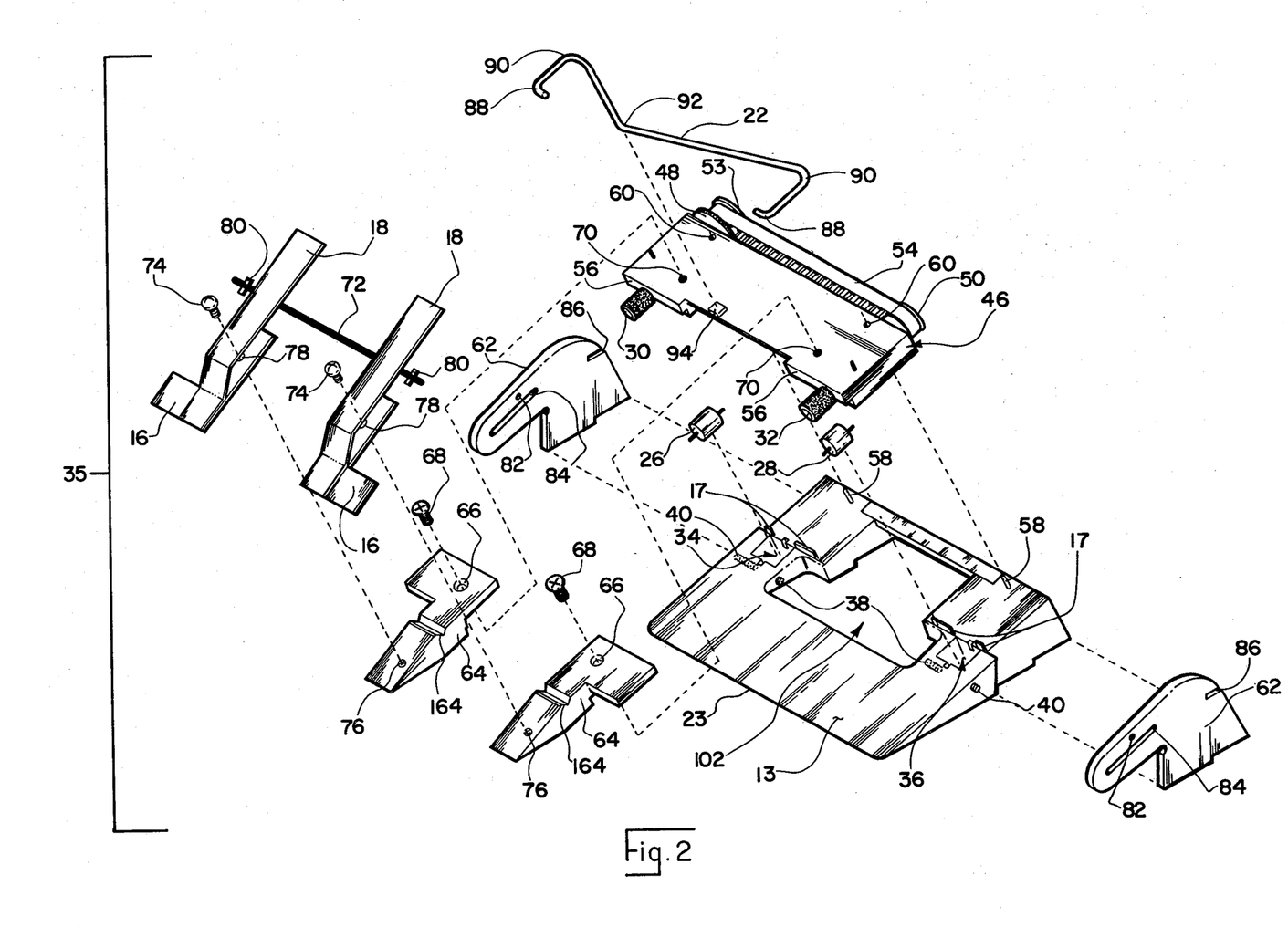
FIG. 2 shows an exploded projection of the paper holding/driving assembly of the pocket plotter of FIG. 1.

In the exploded view of FIG. 2, the paper holding/drive assembly 35 includes rubber idlers 26 and 28 mounted in recesses 34 and 36, respectively, with approximately 20% of the circumference of the curved surface of each idler extending above the surface of ramp 13. Additionally, the longitudinal axis of each of idlers 26 and 28 is substantially parallel to the surface of ramp 13. Each of recesses 34 and 36 includes a main portion to accommodate the rubber roller portions of idlers 26 and 28, respectively, and a forward and rearward slot to accommodate the end portions of the axial shafts of idlers 26 and 28. The rearward slots of both recesses 34 and 36 are formed to a preselected tolerance to maintain the rearward portion of the axial shafts of idlers 26 and 28 in substantially perpendicular alignment with edge 15 of paper 11 (see FIGS. 3a and 3b). The forward slots within recesses 34 and 36 are each equipped with tolerance adjustment means. In this embodiment, the adjustment means consists of a pair of set screws, an inner set screw 38 and an outer set screw 40, in perpendicular alignment with the sides of each of the forward slots. The preferred adjustment of set screws 38 and 40 provides free play on the forward end of the axial shafts of each of idlers 26 and 28 that is equal on both sides of the position in which the axes of idlers 26 and 28 are perpendicular to edge 15 of paper 11. The free play in the forward end of the axial shafts of idlers 26 and 28 is typically adjusted so that there is approximately 0.005 inches of travel to either side of the center position. By allowing this free play on the forward end of the axial shafts of idlers 26 and 28 while not permitting free play on the rearward end of the same axial shafts, edge 15 of paper 11 is continuously forced up against paper stops 17 as paper 11 is advanced in either direction. The increase in the force with which edge 15 of paper 11 exerts on paper stops 17 is proportional to the increase in the tolerance between set screws 38 and 40 and the forward portion of the axial shafts of idlers 26 and 28.

Figure 3A:
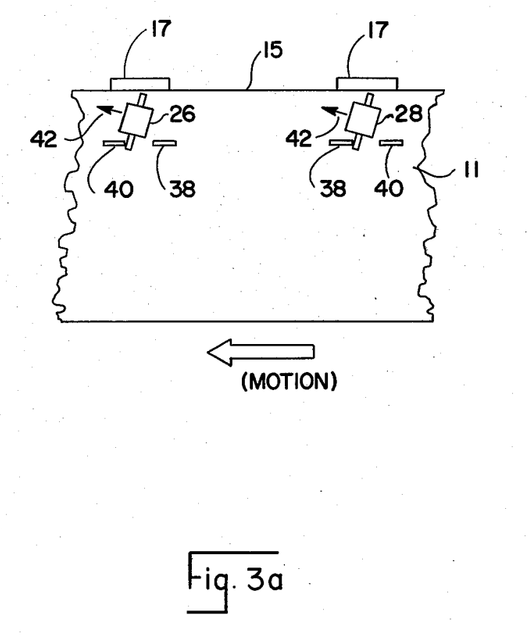
FIGS. 3a and 3b show a simplified view of the idlers feeding the paper up against the paper stops as the paper traverses the paper holding/driving assembly of the pocket plotter of FIG. 1.
Figure 3B:
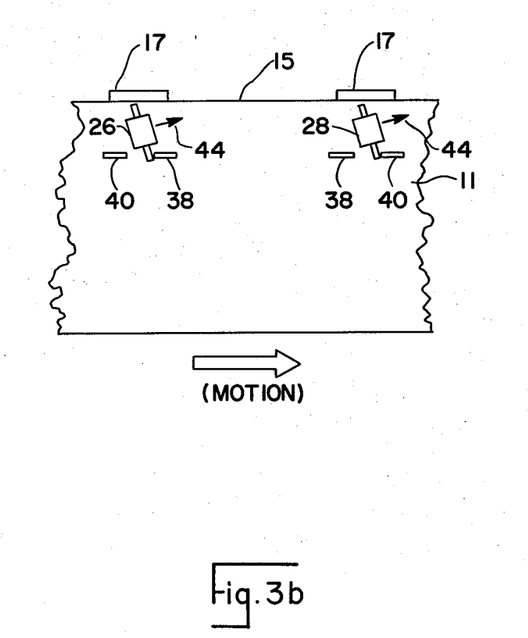

In FIGS. 3a and 3b, the free play in the forward portions of the axial shafts of idlers 26 and 28 is exaggerated to show what causes edge 15 of paper 11 to be forced up against paper stops 17. FIG. 3a shows that if paper 11 moves to the left, the forward ends of the axial shafts of idlers 26 and 28 follow the paper motion until they come up against set screws 40 and 38, respectively. Paper 11 will follow the path of least resistance which is perpendicular to the axial shafts of idlers 26 and 28, i.e., in the direction of arrows 42. Since this path is up ramp 13 (FIGS. 1a and 2), when idlers 26 and 28 are in the positions shown and thus, non-parallel to the forward faces of paper stops 17, edge 15 of paper 11 is forced into contact with paper stops 17.

FIG. 3b illustrates a result similar to the FIG. 3a result when paper 11 moves to the right. Here, the forward ends of the axial shafts of idlers 26 and 28 are skewed to the right. In this configuration, the path of least resistance for paper 11 is in the direction of arrows 44. Thus, edge 15 of paper 11 is maintained in positive contact with paper stops 17 in both directions of travel at all times.

FIG. 2 also shows several additional construction details. Paper drive block 46 is shown with paper drive rollers 30 and 32 coupled to drive gear 48 and pulley 50, respectively, on one side at opposite ends of paper drive block 46 by means of shafts (not shown) which pass through paper drive block 46. Mounted in close proximity to gear 48 on the same shaft is pulley 53. Drive gear 48 is powered by motor 52 (FIG. 1) (motor control circuit not shown). Pulley 53 is connected to pulley 50 by toothed belt 54, and, since the working surfaces of pulleys 50 and 53 have the same diameter, approximately one-half of the power of motor 52 is transferred to paper drive roller 32. Belt 54 is toothed to minimize slippage on pulleys 50 and 53 and pulleys 50 and 53 have a toothed drive surface to mate with the teeth of belt 54. Paper drive roller 30 is also provided with a rough surface to minimize slippage of paper 11 between paper drive roller 30 and rubber idler 26 when paper 11 is moved. The rough surface of paper drive roller 30 produces a series of impressions in edge 15 of paper 11 which acts as an exact mate with the rough surface of roller 30 and acts as a pair of mating gears would, minimizing the slippage of paper 11 with respect to roller 30, with repeated passes of paper 11 back and forth. Thus, the impressions in edge 15 of paper 11 match up with the high and low points of the rough surface of roller 30. Through numerous experiments, it was determined that number 80 to 120 carborundum paper bonded to paper drive roller 30 provides good results at paper 11 transport speeds on the order of 8–12 inches per second. Experimentation has shown that no slippage of paper 11 resulted after a single sheet of paper was driven back and forth approximately four million times. Additionally, to prevent edge 15 of paper 11 from riding up the forward edge of paper stops 17, paper drive rollers 30 and 32 are mounted substantially flush with surfaces 56 of paper drive block 46.

Paper drive block 46 is mounted above ramp 13 with alignment pins 58 fitting loosely within holes 60 of paper drive block 46. In this configuration, paper drive rollers 30 and 32 are directly above idlers 26 and 28 with the rear edge of rollers 30 and 32 and idlers 26 and 28 even with or slightly behind the forward edge of paper stops 17 to which edge 15 of paper 11 is maintained in contact during plotting. Also attached to paper drive block 46 are rails 64. Rails 64 are attached by means of screws 68, the shanks of which pass through holes 66 in rails 64 and thread into threaded holes 70 in paper drive block 46. In turn, levers 18 are fastened to rails 64 by means of screws 74. The shanks of screws 74 pass through the holes 78 in levers 18 and thread into threaded holes 76 in the forward edges of rails 64. Welded to the underside of levers 18 approximately halfway between their most distant ends is fulcrum bar 72. Ears 62 are next attached to the sides of ramp 13 with the ends of fulcrum bar 72 passing through holes 82 in ears 62. In this configuration, tabs 80 welded to fulcrum bar 72 are in contact with the inner side of ears 62 to prevent levers 18 from shifting from side to side swivelling about screws 74. To complete the paper holding/driving assembly 35, spring 22 must be installed. To install spring 22, it is initially placed above paper drive block 46 with spring center bend 92 directly above contact pad 94 and with spring ends 88 pointing toward ramp edge 23. One of spring ends 88 is then inserted in slot 84 in one of ears 62 with spring bend 90 fitting within notch 86 in the same ear 62. The second spring end 88 is then pulled out around the outer edge of the second ear 62 so that it can be inserted into the slot 84 with second spring bend 90 in notch 86 of the second ear 62. With spring 22 in place as described, the paper holding/driving assembly 35 is normally closed with paper drive rollers 30 and 32 in contact with idlers 26 and 28, and jaws 16 in contact with ramp 13. When levers 18 are depressed to open jaws 16, as described above, the forward edge of paper drive block 46 raises separating paper drive rollers 30 and 32 from idlers 26 and 28, respectively, and the rear portion of paper drive block 46 is then depressed onto alignment pins 58 which extend further into holes 60 in paper drive block 46 to permit the insertion or removal of paper 11.

Figure 4:
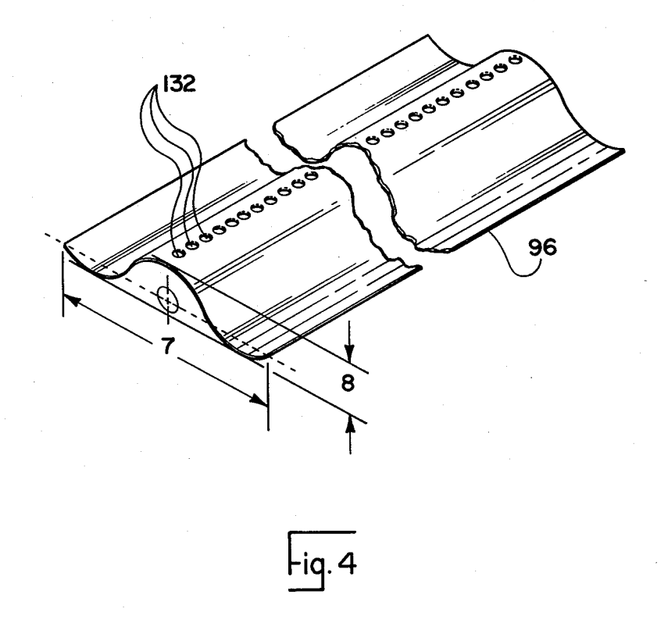
FIG. 4 shows a segment of the triple curvature retractable tape for movement of the pen head of the plotter of FIG. 1.

The second degree of motion necessary for plotting on paper 11 is provided by moving pen head assembly 12 perpendicularly to the side to side movement of paper 11. To accomplish this, pen head assembly 12 is attached to retractable tape 96 (see FIG. 1a). In FIG. 4, a segment of retractable tape 96 is shown. This tape is similar to the thin steel tapes used in retractable carpenter's rules, however, unlike those tapes, this tape is triply bent from edge to edge over its entire length. The purpose of the triple bending is to create a light weight beam on which to mount pen head assembly 12 that will not lose its transverse rigidity as it is extended forward from plotter 10. A doubly bent tape would also produce a similar result. A singly bent tape similar to a carpenter's rule is prone to transverse collapse when it is extended more than a few inches out from its housing. As shown in FIG. 4, one bend occurs down the center of the tape in one direction and the second and third bends are in the opposite directions a distance from each edge of approximately one-quarter of the width of tape 96. All three of these bends occur in the same approximate location over the entire length of the tape and each of these bends has a radius of curvature of approximately one inch so that none of the bends make a sharp crease in the tape material. It is the bending of tape 96 in opposite directions along its overall length that provides the added resistance to transverse collapse and the bending of tape 96 along its edges in the opposite direction to its center bend that minimizes its twisting tendancy over its entire length. It is still possible to cause a temporary high radius of curvature bend 100 across retractable tape 96 at a right angle to these shallow bends without reaching the elastic limit that would impair or destroy these bends thus permitting tape 96 to be rolled up or folded back on itself to minimize its storage volume. This bending is possible since the lengthwise bends are shallow; however, since they are in both directions, tape 96 may have more width for its overall profile height 8 while still more energy is required than in the carpenter's rule to overcome them.

Figure 5:
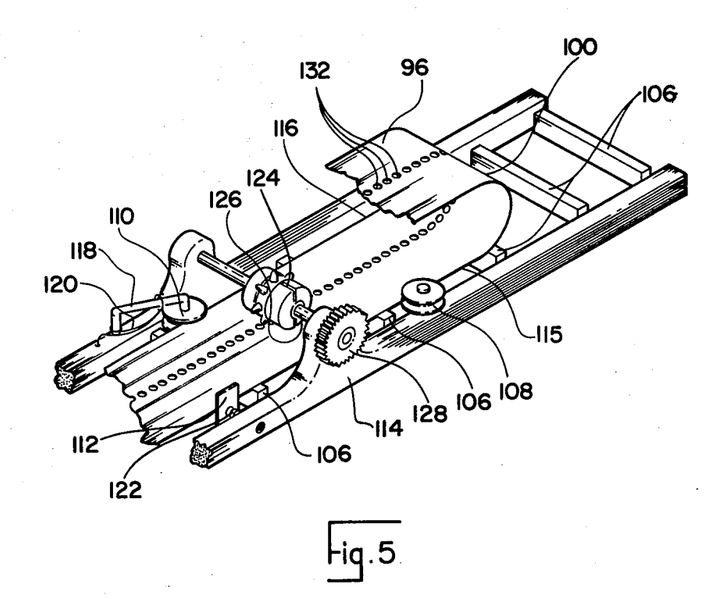
FIG. 5 shows the means for driving and aligning the retractable tape of the plotter of FIG. 1.

Referring again to FIG. 1a, retractable tape 96 is shown in place within pocket plotter 10. One end of tape 96 is connected to the underside of the top of tape retainer 98 and behind paper holding/driving assembly 35. The tape then extends toward the rear edge of plotter 10 and then with a high radius of curvature bend 100 (approximately 0.8 inches), as discussed above, tape 96 is reversed in the direction, i.e., tape 96 is folded back on itself, with the tape then extending out through the front edge of pocket plotter 10 beneath paper drive block 46 and between drive rollers 30 and 32 and idlers 26 and 28 (see FIG. 2) through channel 102. In this configuration, a portion of the underside of tape 98 and another portion is in contact with tape rollers 104. Tape rollers 104 with approximately logarithmic spacing are rotatably mounted between the right and left sides of frame 114. The purpose of rollers 104 is to minimize the drag on tape 96 as it is driven into and out of pocket plotter 10. FIG. 5 shows an alternate embodiment wherein rollers 104 have been replaced with low coefficient of friction skids 106 made from a material such as polytetraflorethylene, commonly sold under the trademark Teflon.

FIG. 5 further shows how retractable tape 96 is maintained in perpendicular alignment with edge 15 of paper 11, and driven into and out of pocket plotter 10. The alignment mechanism includes a pair of rollers 108 and 110 and a contact plate 112. Rollers 108 and 110 are shaped like pulley wheels with circular V-shaped grooves in their edges. Roller 108 is rotatably mounted on a shaft extending upward from frame 114 of pocket plotter 10 with edge 115 of tape 96 fitting within its V-shaped groove. Roller 110 is mounted on one end of a movable U-shaped arm 118 so that the V-shaped groove within roller 110 makes contact with edge 116 of retractable tape 96. The other end of U-shaped arm 118 is mounted on frame 114 on the side opposite roller 108 so that roller 110 is approximately midway between tape roller 108 and contact plate 112. To maintain roller 110 in contact with edge 116 of retractable tape 96, a spring 120 is connected between movable arm 118 and frame 114 forward of tape roller 110. Contact plate 112 is mounted on the same side of frame 114 as tape roller 108 by means of threaded shaft 122. Retractable tape 96 can be positioned so that its edges 115 and 116 are in perpendicular alignment with edge 15 of paper 11 by adjusting the spacing between contact plate 112 and frame 114 by means of threaded shaft 122, since tape edge 115 of retractable tape 96 is biased against tape roller 108 and contact plate 112 by spring-loaded tape roller 110. To minimize the cutting effect of edge 115 of retractable tape 96 as it continually passes by contact plate 112, the contact surface is specially treated to minimize this effect. This can be accomplished by making contact plate 112 of a material such as tungsten carbide or sapphire.

Inward and outward motion is imparted to retractable tape 96 by means of sprocket 124. Sprocket 124 meshes with drive holes 132 located in approximately the center of retractable tape 96 with holes 132 running substantially the entire length of tape 96. Sprocket 124 is rotationally fixed and laterally slidable about on shaft 126 approximately midway between the two slide rail portions of frame 114. The lateral slidability of sprocket 124 is provided so that it remains aligned with drive holes 132 as the direction of retractable tape 96 is adjusted by threaded shaft 122 and contact plate 112. Also mounted on shaft 126 on one side of frame 114 is drive gear 128 which is coupled to tape drive motor 130 (see FIG. 1) (motor control circuit not shown) to provide the necessary motion to tape 96.

Figure 6A:
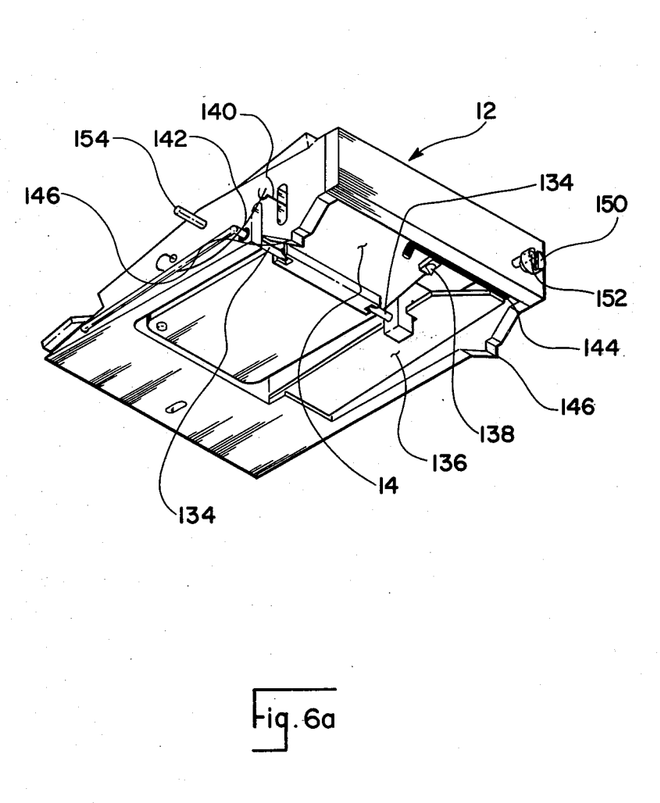
FIGS. 6a and 6b show perspective views of two different pen head assemblies for the plotter of FIG. 1.
Figure 6B:
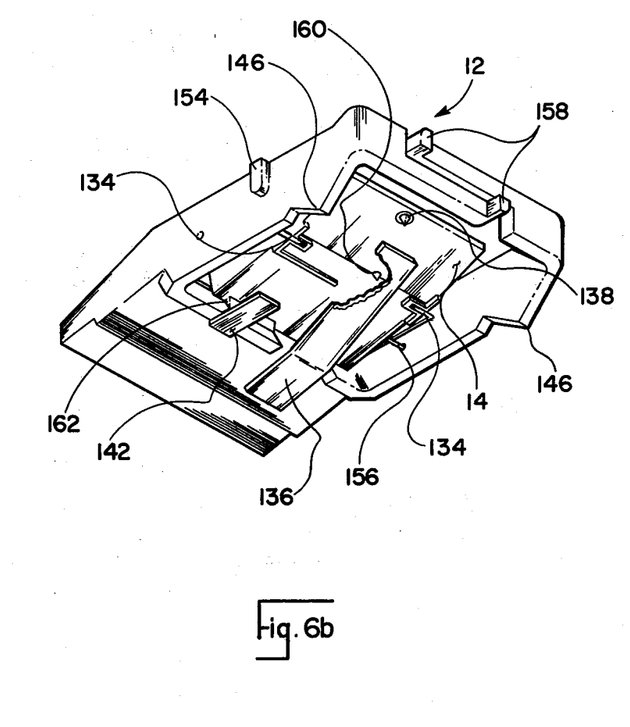

FIGS. 6a and 6b each show a pen head assembly 12 viewed from the underside having a pen unit 14 pivoted approximately about its center of gravity on mounting pins 134 and a bimorph 136 for controlling the raising and lowering of pen tip 138 of pen unit 14, up from and onto paper 11.

FIG. 6a more specifically shows spring loop 140 protruding from the side near the forward edge of pen unit 14 and extending through the outer frame of pen head assembly 12 where it is coupled with pen down spring 142 attached to the side of the frame of pen head assembly 12 to bias pen unit 14 downward such that pen tip 138 is in contact with paper 11. In turn, bimorph 136 is cantileverly mounted at the rear of the frame of pen head assembly 12, and has its forward end coupled to the forward edge of pen unit 14 by means of pen-up spring 144. Pen-up spring 144 is designed such that it has a greater lifting force on the forward edge of pen unit 14 than the effective force pen-down spring 142 exerts on the same point of pen unit 14. Thus, when power is applied, pen-down spring 142 is enabled to effect contact between pen tip 138 and paper 11. By pivoting pen unit 14 around its center of gravity, a very small moment is necessary to bring pen tip 138 in contact with paper 11; as a result, only a fraction of a gram to a few grams of pressure is exerted by pen tip 138 on paper 11. As a result of the light pressure exerted by pen tip 138 on paper 11, the wear of pen tip 138 is relatively non-existent, thus lengthening the life of pen tip 138. Additionally, a sharper pen tip 138 can be used which will permit the drawing of finer lines and smaller characters.

Also incorporated into the main frame portion of pen head assembly 12 are pen head assembly rest points 146. Rest points 146 support the weight of the entire assembly as it travels over paper 11, thus enabling bimorph 146 merely to control the upward and downward motion of pen tip 138 of pen unit 14. Pen head assembly rests 146, so as not to smudge the ink as pen unit 14 is writing, are located either forward of or slightly behind pen tip 138 when viewing pen head assembly 12 perpendicularly from either side. Also included in this embodiment of pen head assembly 12 is adjusting screw 150. Adjusting screw 150 has a non-concentric hole 152 therethrough into which the end of pen up-spring 144 which contacts bimorph 136 and pen unit 14 is located. Thus, by turning adjusting screw 150, the user can adjust the distance of travel through which the front edge of pen unit 14 moves between its up and down positions. This is particularly desirable in that it permits the limiting of the downward motion of the forward edge of pen unit 14 to thus minimize the amount of pressure between pen tip 138 and paper 11 and to maximize the life of the shape point of pen tip 138 to improve the writing quality of fin lines and small characters by pen tip 138.

The embodiment of pen head assembly 12 shown in FIG. 6b also includes a pen unit 14 that is mounted to rotate about its approximate center of gravity utilizing mounting pins 134 which are at the ends of springs 156 which, in turn, are attached to the inner surface of the side frame portion of pen head assembly 12. Pen unit 14 is mounted in this fashion to permit the user to easily remove and replace pen unit 14 by pinching together tabs 158 on the forward edge of the frame of pen head assembly 12 causing mounting pins 134 to be withdrawn from the mounting pockets of pen unit 14. Up and down motion is imparted to pen tip 138 and pen unit 14 in a manner which is similar to that shown in FIG. 6a. In FIG. 6b, bimorph 136 comes in contact with contact point 160 which is forward of the approximate center of gravity and the mounting pins 134 and provides the force necessary to raise pen tip 138 from the paper in opposition to pen-down spring 142 which is mounted on the rear surface of the frame of pen head assembly 12 and makes contact with the rear edge of pen unit 14 at contact point 162. Pen-down spring 142 thus works in opposition to the lifting force applied to pen unit 14 by bimorph 136 when it is unexcited to lower pen tip 138 to paper 11.

High speed plotters such as the one disclosed herein require a fast pen-lift mechanism to move pen tip 138 up and down from the paper 11, while the servo system traces out the character or graph. Since the lift mechanism moves around with pen unit 14 itself, as the plotting is being performed, it is desirable that the pen lift mechanism be as light as possible and therefore have low inertia. Bimorph 136 easily meets these requirements, while at the same time being fast, simple, and inexpensive to construct while consuming very little power. A bimorph typically consists of a sandwich of two layers of piezoelectric material (typically PZT)

having their poles in opposite directions. Application of an electric field, parallel to the poling directions, causes one layer to contract and the second layer to expand. The net resultant motion, similar to the action of a bimetal strip, is a lateral deflection of the bimorph perpendicular to the plane of the lamination. In the applications shown in FIGS. 6a and 6b, the bimorph is clamped as a cantilever beam and application of an appropriate voltage across its terminals causes its tip to cantilever down allowing pen tip 138 to move with it as it is biased by pen-down spring 142. Because of the low mass and high mechanical stiffness of the bimorph, it has a good frequency response extending up to several hundred Hertz, which in an application as shown in FIGS. 6a and 6b, will allow this type of plotter to print up to approximately 20 characters per second without noticeable degradation of the print quality or the shape of the characters. Another advantage of bimorphs is that they only require power during the desired deflection since they are basically capacitive, therefore, only a moderate amount of power is necessary to raise and lower pen tip 138 from and to paper 11. The power necessary to activate bimorph 136 is provided by wires 168 which are mounted on retractable tape 96 (see FIG. 1).

From the combination of FIGS. 1a, 2, 6a, and 6b, the mechanism for lifting pen head assembly 12 from the surface of paper 11 when retractable tape 96 is fully retracted into pocket plotter 10 can be seen. As tape 96 is retracted into pocket plotter 10, pen head assembly rests 146 approach forward edge 23 of ramp 13 and at the same time, pen head assembly lifting tabs 154 approach the forward tip of rails 64. As retracton of retractable tape 96 continues, pen head assembly lifting tabs 154 continue to ride above the forward edge of rails 64 and approximately half-way between the forward edge and notch 126, they come in contact with the forward sloping surface of rails 64. Retractable tape 96 continues to be retracted into pocket plotter 10 until pen head assembly lifting tabs 154 rest within notches 164 on rails 64. Once pen head assembly lifting tabs 154 come in contact with the forward edge of rails 64, a lifting force is applied to pen head assembly lifting tabs 154 lifting pen head assembly 12 from the surface of paper 11. Any one of several mechanisms can be incorporated into pocket plotter 10 to limit the retraction of tape 96 so that pen head assembly 12 is not retracted into the front portion of the plotter beyond the point where pen head assembly lifting tabs 154 come in contact with notches 164. This limiting of the retraction of tape 96 can be accomplished by placing a switch near the rear edge of the storage region of tape 96 within retainer 98 which is activated by contact with tape bend 100 when tape 96 is fully drawn into plotter 10. Another means to limit the retraction of tape 96 into pocket plotter 10 is by using an optical detector and a light source to prevent motor 130 from continuing to rotate in the direction necessary to further retract tape 96 when the light beam is broken or completed, depending on the configuration used. Hole 166 in tape 96 as shown in FIG. 1a could be utilized to allow the completion of the beam between the light and the detector which, in turn, would trigger the necessary circuitry to deactivate motor 130 as necessary.

Figure 7:
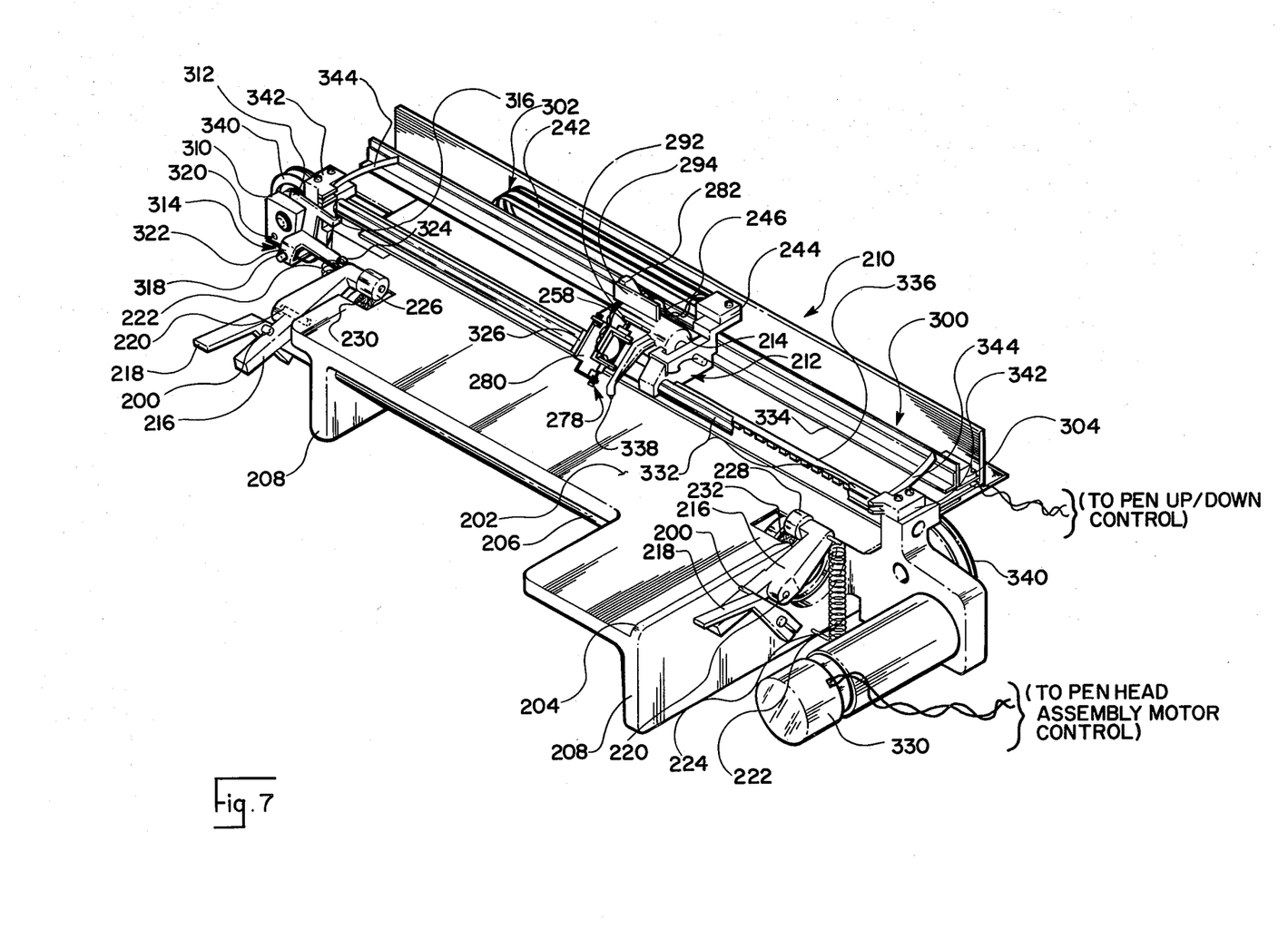
FIG. 7 shows a projection of an assembled table plotter of the present invention.
Figure 8:
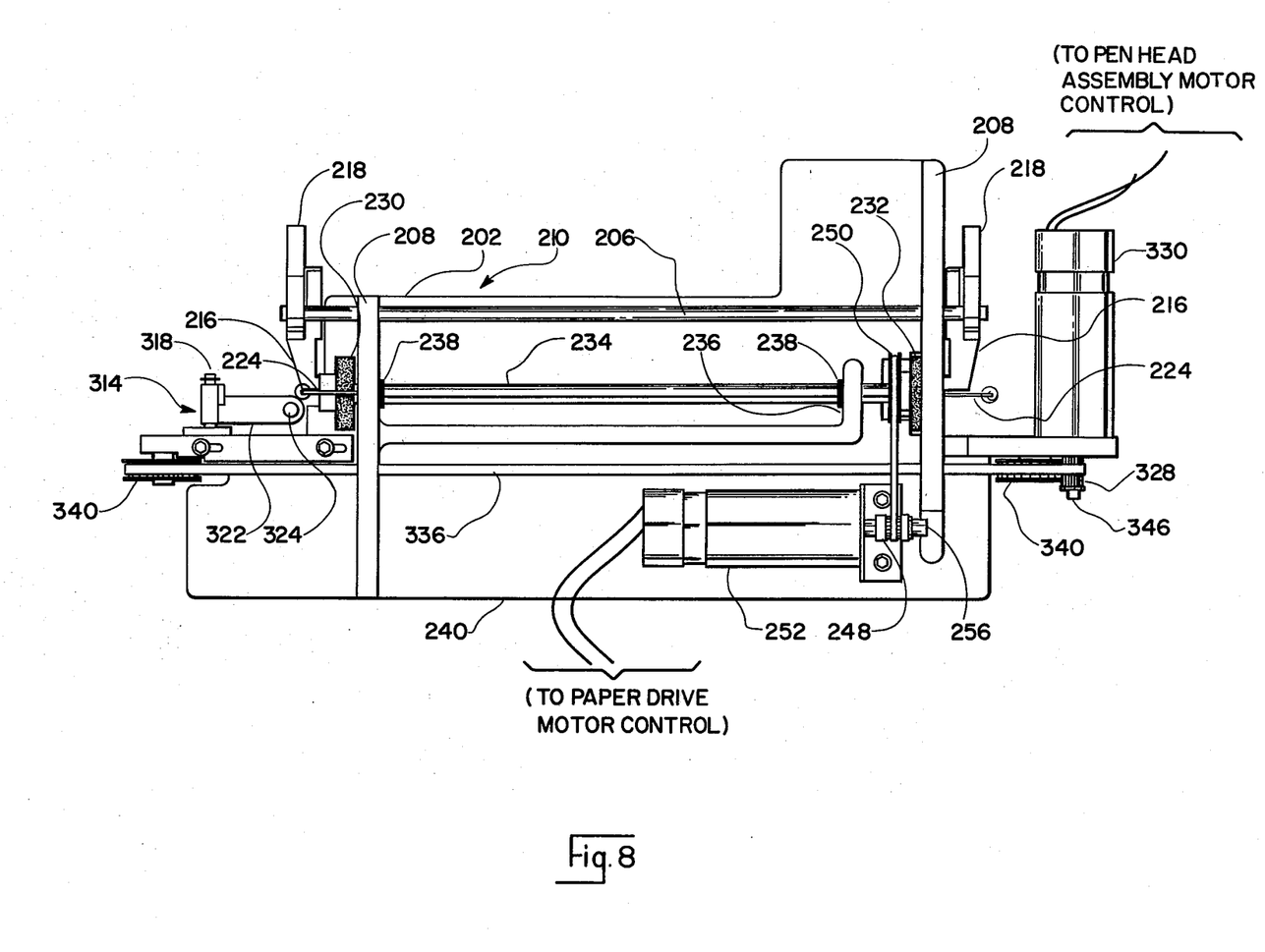
FIG. 8 shows a bottom view of the table plotter of the present invention.

With reference to FIGS. 7 and 8, there is shown a table plotter 210 dimensioned to contain means and apparatus for moving a sheet of paper (not shown) on which a plot is to be made, for moving pen head assembly 212, and for raising and lowering pen unit 214 within pen head assembly 212.

A sheet of paper is inserted into plotter 210 with one edge between left idler 226 and left paper drive roller 230 and the opposite parallel edge of the sheet of paper between right idler 228 and right paper drive roller 232. To insert the paper into plotter 210, the right edge of the paper is placed flush with alignment surface 204, then as the paper is pushed slowly forward into plotter 210 either or both of levers 218 are depressed, causing right and left idlers 228 and 226, respectively, to be lifted from right and left paper drive rollers 232 and 230, respectively. Levers 218 are securely fastened to opposite ends of connecting rod 206 adjacent to the outer surface of plotter table legs 208. Between levers 218, connecting rod 206 is journaled through each of plotter table legs 208. Thus, if either of levers 218 is depressed, the other lever rotates in the same direction simultaneously. Pressed into the inner sides of each of the levers 218 is pin 200. As lever 218 is depressed, pins 200 exert pressure on the tail end portion of idler arms 216. In turn, each of idler arms 216 are journaled about shafts 220 with each of shafts 220 being pressed into the side portion of table 202. Thus as pins 200 depress the tail end portion of idler arms 216, the idler arms are caused to rotate about shaft 220 thus lifting idlers 226 and 228 up from their respective drive rollers 230 and 232, respectively. To provide closure of idlers 226 and 228 with drive rollers 230 and 232, each idler arm has affixed to the forward portion thereof a spring 222. The second ends of each of springs 222 are connected to pins 224 which projects from the outer surface of each plotter table legs 208 forward of each of shafts 200. Thus, as levers 218 are depressed, pin 200 presses on the tail end of idler arms 216, idlers 226 and 228 are then lifted from drive rollers 230 and 232, respectively, in opposition to spring 222 thus permitting the insertion of the sheet of paper between idlers 226 and 228 and drive rollers 230 and 232, respectively.

Left and right paper drive rollers 230 and 232 are fixedly attached to opposite ends of shaft 234. Shaft 234 is journaled through left plotter table leg 208 and support member 236 by means of bearings 238 with paper drive rollers 230 and 232 attached at the furthest extents of shaft 234. In addition, pulley 250 is mounted on shaft 234 between right paper drive roller 232 and the outer surface of support member 236. Attached to the rear edge 240 of plotter table 202 is paper drive motor 252. Motor 252 is mounted so that motor shaft 256 is parallel to shaft 234. Mounted on motor shaft 256 is paper drive pulley 248 aligned so that it is substantially opposite pulley 250 on shaft 234. Pulley 250 and paper drive pulley 248 are connected one to the other by a toothed belt 254. To minimize the slippage of belt 254 on paper drive pulley 248 and pulley 250, the drive surfaces of these pulleys are toothed to mate with the teeth on belt 254. Since left and right paper drive rollers 230 and 232 are mounted on shaft 234, approximately one-half of the power of motor 252 is transferred to each of drive rollers 230 and 232. Thus, by causing motor 252 to rotate in a selected direction through a selected angle, paper drive rollers 230 and 232 also rotate in the same direction and through an angle which is dependent on the ratio of the diameters of paper drive pulley 248 to pulley 250 to cause the paper to move in a desired linear direction and through a desired distance to provide one degree of motion for the plotting process.

Referring again to FIG. 7, it can be seen that pen head assembly 212 is slidably affixed to and between shaft 332 and lip 334. Pen head assembly 212 is also attached between opposite ends of toothed belt 336 to provide transverse motion to the assembly perpendicular to the travel of the paper induced by paper drive rollers 230 and 232. Toothed belt 336 extends from each side of pen head assembly 212 looping around pulleys 340 and pen assembly drive pulley 328 mounted on shaft 346 of pen drive motor 330. The working surface of pen assembly drive pulley 328 and pulleys 340 are toothed to mate with the toothed surface of toothed belt 336. Thus, by selectively activating paper drive motor 330 and causing its shaft to rotate a selected direction through a selected angle, pen head assembly 212 can be moved in the desired direction through the desired lateral distance thus providing the second degree of motion necessary to cause plotting of the desired figure on the paper.

To prevent pen head assembly 212 from travelling too far along its track, limit switches 342 are provided at the extreme opposite ends of its travel. As pen head assembly 212 approaches either end of the track, the side surface of the assembly will come in contact with limit switch lever 344 which, in turn, will close limit switch 342 preventing pen drive motor 330 from rotating further in the same direction. Also shown in FIG. 7 is a pen capping mechanism to prevent evaporation of the ink from pen unit 214 when plotter 210 is not in use. After completion of the final plot, if pen head assembly 212 is caused to travel to the extreme left end of its track pen assembly contact point 326 will push cap arm contact point 316 causing pen capping assembly 314 to swivel about shaft 318 causing cap arm 322 to rise toward pen tip 338 and causing pen cap 324 to cap pen tip 338 when pen head assembly 212 reaches the end of its travel and closes limit switch 342. Pen capping assembly 314 is swivelly mounted on shaft 318 and when pen head assembly 212 is not at the left most extreme of the plotting table 202, pen cap arm 322 is normally in the configuration shown in FIG. 7. To ensure that pen tip 338 is uncapped as pen head assembly 212 moves to the right from its rest position, pen cap arm 322 is biased downward by spring 320. It should further be noted that as pen head assembly 212 travels to its final position on the left end of table 202, the force between pen assembly contact point 326 and cap arm contact point 316 is great enough to overcome the biasing force of spring 320 and to complete the capping of pen tip 338. To prevent pen cap arm 322 from rotating too far downward as pen head assembly 212 moves from the left most end of its track, and to maintain cap arm contact point 316 in position to make contact with pen assembly contact point 326 when pen head assembly 212 returns to its rest position, pen capping assembly 314 is also provided with a travel limit arm 312 which comes up against stop 310 as pen cap arm 322 is biased downward to its rest position when not in use by spring 320.

Figure 9A:
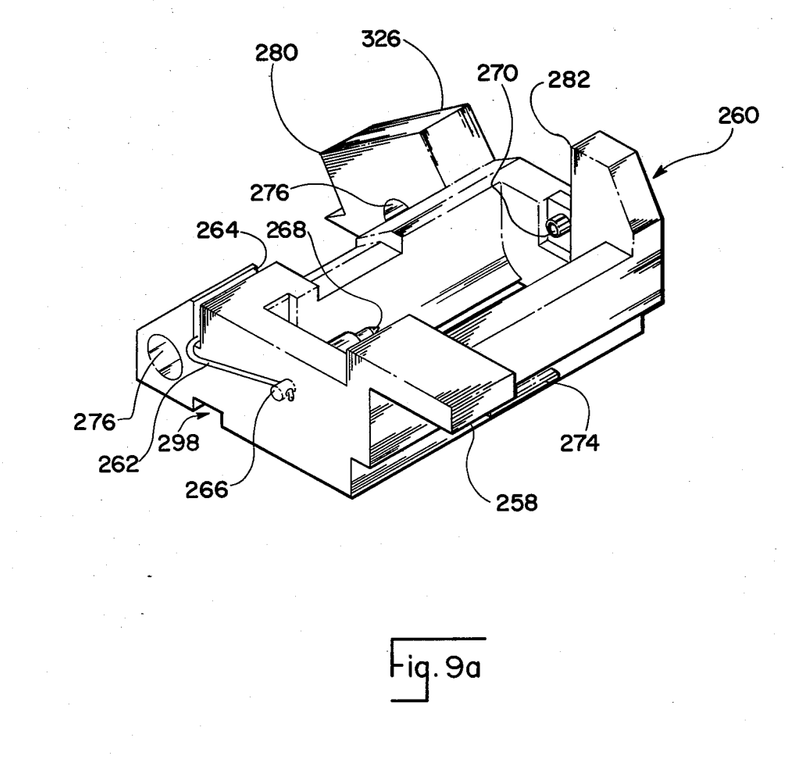
FIGS. 9a and 9b show two views of the pen carriage for the plotter shown in FIGS. 7 and 8.
Figure 9B:
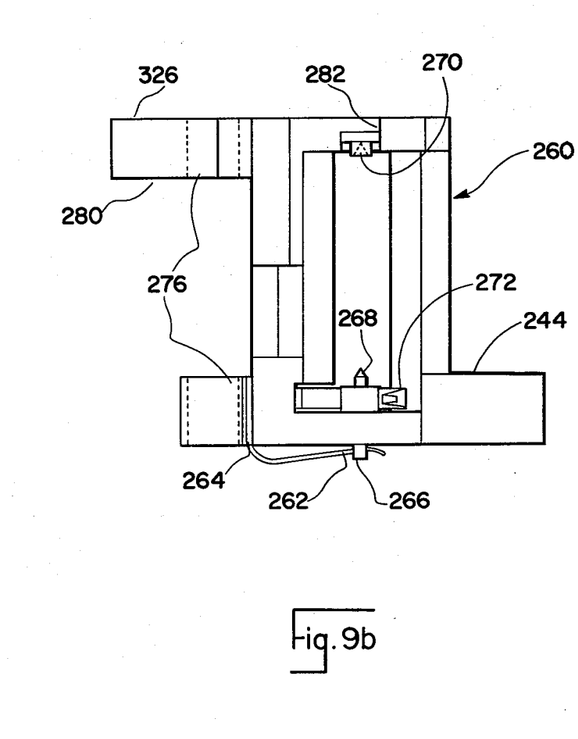
Figure 10A:
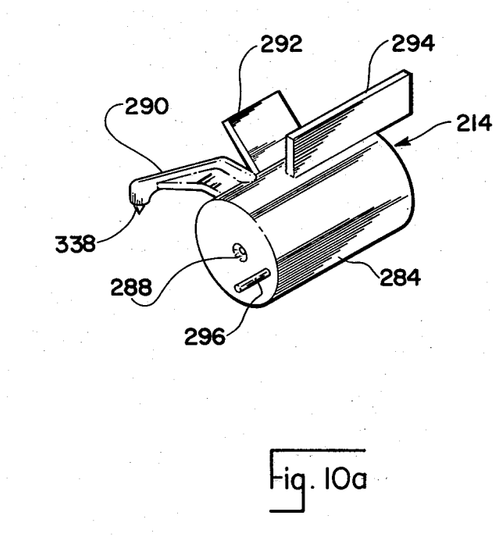
FIGS. 10a and 10b show two views of the pen unit for use in the pen carriage shown in FIGS. 9a and 9b.
Figure 10B:
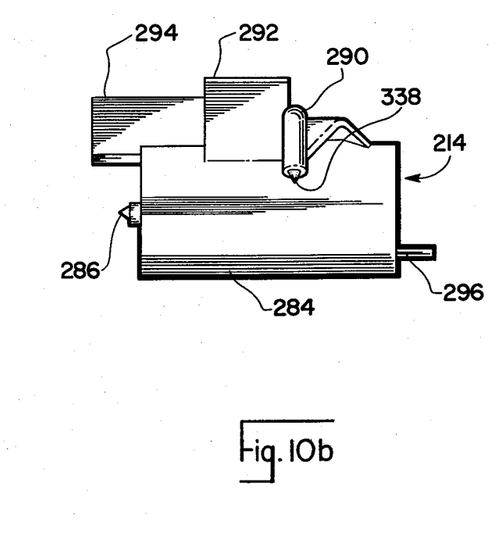

The three main elements of pen head assembly 212 are shown in FIGS. 7, 9, and 10. These elements are pen carriage 260, pen unit 214, and pen raising solenoid 278. In FIGS. 9a and 9b two different views of pen carriage 260 are shown, in FIGS. 10a and 10b two views of pen unit 214 are shown, and in FIG. 7 all three elements are shown assembled and in place on table plotter 210. Pen unit 214 (FIGS. 10a and 10b) includes an ink reservoir 284 in the shape of a cylinder having extending therefrom an ink tube 290 which terminates in pen tip 338. At opposite ends of the cylindrical ink reservoir 284 there are a mounting dimple 288 and a mounting point 286 so that the pen unit 214, when in place, swivels about its approximate center of gravity. Extending outwardly from the curved surface of the cylinder and perpendicular to the axis of the cylindrical reservoir 284 are solenoid contact tab 292 and pen up-limit tab 294. Additionally, there is a stub 296 which extends outwardly from the end of the cylindrical ink reservoir 284 having mounting dimple 288. Stub 296 is mounted parallel to the central axis of the cylindrical ink reservoir 284 and near the outward edge of the circular end of the cylinder. The purpose of tabs 292, 294, and stub 296 will become clear from the following discussion.

From FIGS. 9a and 9b we can see that pen carriage 260 is dimensioned to hold pen unit 214. Pen unit 214 is inserted into pen carriage 260 from above with mounting point 286 and mounting dimple 288 of pen unit 214 mating with pen retainer socket 270 and pen retainer point 268, respectively, of pen carriage 260. Pen retainer point 268 is spring biased to hold pen unit 214 firmly in place by exerting a force along the central axis of ink reservoir 284 and therefore holding mounting point 286 up against pen retainer socket 270. Pen retainer point 268 is spring biased by spring 262 which passes through a hole in the outer end of pen retainer shaft 266 which extends through the side of pen carriage 260, with the other end of spring 262 passing through slot 264 in the forward edge of one of the arms of pen carriage 260. In addition, when in place, stub 296 of pen unit 214 is biased upward by spring 272 thus maintaining contact between the paper and pen tip 338. Also included in pen carriage 260 are retaining tab 274 and mounting holes 276. When pen carriage 260 is mounted on table 202, holes 276 encircle shaft 232 and tab 274 fits beneath lip 334 which permits motion of the pen head assembly 212 from side to side and prevents this assembly from lifting from the surface of the track. In each side of pen carriage 260 are belt mounting slots 298 wherein the ends of belt 336 are retained by conventional means thus allowing pen head assembly 212 to be pulled in the desired direction by belt 336 as described above. Two other features that are included in pen carriage 260 are solenoid mounting surface 280 and pen up-stop 282. The purpose of these other features will become clear from the following discussion.

Again, referring to FIG. 7, there is shown a pen raising solenoid 278 which is mounted on solenoid mounting surface 280 of pen carriage 260. Pen raising solenoid 278 is mounted such that its internal shaft 258 is in position to exert pressure on solenoid contact tab 292 in response to an electrical signal applied to pen raising solenoid 278. When power is applied to solenoid 278, internal shaft 258 extends outwardly and comes in contact with solenoid contact tab 292 and continues to extend outwardly from the solenoid causing pen unit 214 to rotate about its central shaft thus causing pen tip 338 to be raised from the surface of the paper. To limit the rotational motion of pen unit 214 as a result of the pressure from solenoid 278, pen unit 214 is also equipped with a pen up-limit tab 294. As solenoid 278 continues to cause pen unit 214 to rotate about its central axis within a selected rotational distance, pen up-limit tab 294 comes in contact with adjustable pen up-stop 282 thus stopping any further rotation of pen unit 214.

As the paper is being driven into and out of plotter 210 and pen head assembly 212 is being driven across the plotter table 202, solenoid 278 is selectively energized and de-energized to raise and lower pen tip 338 from the surface of the paper to cause the plotting of selected characters and lines. Power is applied to solenoid 278 by means of a pair of wires 246 which run from the solenoid around the pen carriage 260 ending at interface pad 244. Also connected to interface pad 244 is one end of flexible conductive ribbon 242 having two conductive traces enclosed therein, each of these traces being connected electrically to a different one of wires 246. Conductive ribbon 242 then extends to the left from pen head assembly 212 having a loop 302 allowing the conductive ribbon 242 to then extend back to the right within channel 300 and with its second end fixed at terminal 304. From terminal 304, conductive ribbon 242 is connected to the pen up-down control unit (not shown). By using flexible conductive ribbon 242 to interface between the pen up-down control unit and pen head assembly 212, a flexible interconnection between the two units is possible, thus eliminating the necessity of having a pair of slide wires or other fixed means for providing power as required to solenoid 278.

In either of the above-discussed embodiments, a thermal print head can be substituted for pen 14. With a thermal print head it need not be raised and lowered to the web. Instead, the thermal print surface would be maintained parallel to the surface on which the image is to be developed. Also, the signal used in the pen equipped versions to raise and lower pen 14 would function to apply and remove power to or from the thermal print head. Additional types of printing mechanisms (e.g., print wheels, scribes, hot wires, etc.) can also be accommodated in the plotter embodiments discussed above by making similar modifications.

We claim:

1. An X-Y plotter system for forming images on a web comprising:
    first means being coupled to at least one edge of said web for imparting motion thereto to provide a first degree of motion during plotting onto said web in response to a first applied signal;
    second means for forming selected visual images on said web and being movable to provide a second degree of motion in response to a second applied signal; and
    third means responsive to a third applied signal for imparting motion to said second means;
    said first means including first drive means having at least one powered drive wheel contacting the web, and an idle wheel opposite to each of said drive wheels to form a pinch roller assembly with the web between the drive and the idler wheels, one of said at least one drive and idler wheels having a rough surface, and said drive and idler wheels additionally being spring biased together to cause the rough surface to make a series of indentations along the driven edge of the web to minimize slippage with these indentations repeatably mating with the rough surface of the drive wheel as the web is driven back and forth, wherein the rough surface on one of said at least one powered drive and idler wheels of the first drive means has a random pattern, size, and height of rough spots.

2. An X-Y plotter system as in claim 1 wherein:
    said first means includes at least two powered drive wheels;
    said first drive means includes a motor means coupled to one of said at least two powered drive wheels for moving said web in response to the first applied signal; and
    said first means further comprising:
        a pulley wheel directly coupled to each drive wheel; and
        a tooth belt of a flexible material passing over each pulley wheel to share the power of the second drive means between each drive wheel;
        said pulley wheels each having a toothed surface to substantially mate with the toothed belt to minimize slippage between any of the drive wheels and the web and to substantially equalize the power delivered to each of the drive wheels.

3. An X-Y plotter system as in claim 1 wherein said first means further includes:
    shaft means for coupling said drive wheels one to the other;
    first and second pulley wheel means coupled to the first drive means and to the shaft means for transmitting power therebetween; and
    a toothed belt of a flexible material for interconnecting the first and second pulley wheel means;
    said pulley wheel means each having a toothed surface to substantially mate with the toothed belt to minimize its slippage.

4. An X-Y plotter system as in claim 1 wherein said first means further includes ramp means for contacting the underside of said web and causing the driven edge of the web to be bent up from the plotting surface by a selected angle to reduce the yaw and in/out motion of the web as it is driven.

5. An X-Y plotter system as in claim 4 wherein:
    said ramp means further:
        defines a recess for each of said idler wheels of the first drive means within its upper surface and slots formed to a preselected tolerance to accept the forward and rearward axial shafts of each idler wheel, said idler wheels being free to rotate in substantially the direction of travel of the web;
        includes seventh means coupled to the forward shaft slots of each of the ramp means recesses for limiting the free-travel tolerance of the forward shaft of each idler wheel to a selected tolerance; and
    said first means further includes paper stop means extending upward from the top surface of ramp means behind and adjacent to the idler wheels for aligning the driven edge of the web to assure repeatability of the plotting of a particular image at a selected location of the web;
    said seventh means being adjusted to provide greater free-play for the forward axial shafts as opposed to the rearward axial shafts of the idler wheels for permitting the forward end of idler wheels to follow the web in its direction of travel to produce a path of travel for the driven edge of the web having a first vector component that is parallel to the forward edge of paper stop means and a second vector component that is perpendicular to the forward edge of paper stop means to keep the driven edge of the web in communication with the paper stop means to maintain the alignment of the web.

6. An X-Y plotter system as in claim 4 wherein said first means further includes:
    a pair of mounting pins mounted substantially perpendicularly to the top surface of the ramp means near its rear edge for slidingly engaging said drive means to maintain said drive wheels in substantial alignment above said idler wheels;

first spring bias means for maintaining said drive wheels in communication with said idler wheels; and lever means affixed to said drive means for separating said drive wheels and said idler wheels in opposition to said first spring bias means to permit the insertion and removal of said web.

7. An X-Y plotter system as in claim 1 wherein said second means further includes a thermal print head assembly having:

thermal print means mounted substantially parallel to the web;

eighth means for selectively applying image forming power to the thermal print means in response to an applied signal.

8. An X-Y plotter system as in claim 7 wherein:

said thermal print head assembly is of a lightweight construction to maximize the speed at which it traverses the web; and said eighth means includes flexible conductor means for coupling the image forming power to the thermal print means from a fixed position in the system.

9. An X-Y plotter system as in claim 8 wherein said third means further includes:

second drive means for causing said thermal print head assembly to traverse a predetermined path of travel in response to said third applied signal; and sixth means for limiting the travel of said thermal print head assembly to the predetermined path by removing the third applied signal from the second drive means when the pen head assembly reaches either end of its predetermined path of travel.

10. An X-Y plotter system as in claim 1 wherein said second means further includes a pen head assembly having:

pen means rotationally mounted therein substantially at its center of gravity for minimizing the energy necessary to raise and lower the pen tip; and fourth means for raising and lowering the pen tip in response to an applied signal.

11. An X-Y plotter system as in claim 10 wherein:

said pen head assembly in of a lightweight construction to maximize the speed at which it traverses the web; and said fourth means includes:

fifth means of a lightweight, low mass construction for providing a short response time to the applied signal for raising and lowering the pen tip; and flexible conductor means for coupling the raising and lowering applied signal to the fifth means from a fixed position in the system.

12. An X-Y plotter system as in claim 11 wherein said third means includes:

second drive means for causing said pen head assembly to traverse a predetermined path of travel in response to said third applied signal; and sixth means for limiting the travel of said pen head assembly to the predetermined path by removing the third applied signal from the second drive means when the pen head assembly reaches either end of its predetermined path of travel.

13. An X-Y plotter system as in claim 11 wherein said fifth means includes:

second spring bias means for biasing the pen means to cause the pen tip to contact the web; and a bimorph coupled to said pen means for raising and lowering the pen tip from and to the web in opposition to, and cooperation with, respectively, the second spring bias means in response to the second applied signal.

14. An X-Y plotter system as in claim 1 wherein:

said plotter system further including housing means for accommodating said first, second, and third means; and said third means includes:

boom means coupled between said second means and said housing for extending and retracting said second means outward from and into the housing means.

15. An X-Y plotter system as in claim 14 wherein said housing means further includes lifting means for lifting said second means from the web when said boom means has been substantially fully retracted into the housing means.

16. An X-Y plotter system as in claim 14 wherein said boom means includes a thin steel tape having at least three high radius permanent bends long its entire length to provide a lightweight transversely semi-rigid boom as it is extended and retracted to provide plotting repeatability.

17. An X-Y plotter system as in claim 16 wherein said steel tape is retracted into and fed out from a coil of said tape having a radius that is sufficiently large so that the elastic limit of the tape is not exceeded.

18. An X-Y plotter system as in claim 16 wherein said steel tape is folded back on itself from end to end with a radius at the fold that is sufficiently large so that the elastic limit of the tape is not exceeded, said fold being movable within said housing means as the tape is retracted into and fed out from said housing means.

19. An X-Y plotter system as in claim 18 wherein said housing means includes friction reduction means in communication with said steel tape at the point of said fold for minimizing the drag on said tape as it is retracted into and fed out from said housing means.

20. An X-Y plotter system as in claim 19 wherein said friction reduction means includes a plurality of freely rotatable rollers mounted with their longitudinal axis substantially perpendicular to the direction of travel of the tape.

21. An X-Y plotter system as in claim 19 wherein said friction reduction means includes a plurality of low coefficient of friction skids.

* * * * *

UNITED STATES PATENT AND TRADEMARK OFFICE
CERTIFICATE OF CORRECTION

PATENT NO. : 4,384,298

DATED : May 17, 1983

INVENTOR(S) : Lawrence J. LaBarre, et al.

It is certified that error appears in the above—identified patent and that said Letters Patent is hereby corrected as shown below:

Column 3, line 55, delete "20" and insert --20°--;

Column 8, line 46, delete "bimorth" and insert --bimorph--;

Column 13, line 50, delete "idle" and insert --idler--.

Signed and Sealed this

Thirteenth Day of March 1984

[SEAL]

Attest:

GERALD J. MOSSINGHOFF

Attesting Officer

Commissioner of Patents and Trademarks